United States Patent [19]

Olsen et al.

[11] Patent Number: 5,036,886
[45] Date of Patent: Aug. 6, 1991

[54] DIGITAL SERVO VALVE SYSTEM

[75] Inventors: Zenny Olsen, Farmington; Albert J. Sperbeck, Glastonbury; Eric Hamman, Newington; Gary D'Angelo, Southington, all of Conn.

[73] Assignee: Olson Controls, Inc., Bristol, Conn.

[21] Appl. No.: 524,637

[22] Filed: May 16, 1990

Related U.S. Application Data

[62] Division of Ser. No. 283,190, Dec. 12, 1988, Pat. No. 4,951,549.

[51] Int. Cl.⁵ ............................................. F15B 13/044
[52] U.S. Cl. ............................ 137/625.65; 137/625.69; 251/129.11; 251/282
[58] Field of Search ....................... 137/625.65, 625.69; 251/129.11, 282

[56] References Cited

U.S. PATENT DOCUMENTS

| | | |
|---|---|---|
| 2,747,612 | 5/1956 | Lee . |
| 3,899,956 | 8/1975 | Olsen .................................. 91/368 |
| 3,939,938 | 2/1976 | Inoue .................................. 91/380 X |
| 4,155,535 | 5/1979 | Seamone . |
| 4,220,178 | 9/1980 | Jackson . |
| 4,235,156 | 11/1980 | Olsen . |
| 4,492,246 | 1/1985 | Prescott et al. . |
| 4,503,888 | 3/1985 | Brovald .............................. 137/625.65 |
| 4,660,431 | 4/1987 | Heine . |
| 4,673,160 | 6/1987 | Tolley . |
| 4,674,539 | 6/1987 | Sloate .............................. 137/625.64 |
| 4,732,174 | 3/1988 | Ueno .......................... 251/129.11 X |
| 4,901,627 | 2/1990 | Schulze ............................ 91/380 X |

FOREIGN PATENT DOCUMENTS

1056533 1/1967 United Kingdom ........... 137/625.69

Primary Examiner—Gerald A. Michalsky
Attorney, Agent, or Firm—McCormick, Paulding & Huber

[57] ABSTRACT

A novel digital servo valve system for use in displacing an actuator is capable of operating either in closed or open loop mode. The system includes a controller that compares computed values of actuator parameters with preselected parameter values and iteratively determines therefrom command signals for the servo valve. The servo valve is characterized by a ball screw mechanism that eliminates mechanical backlash and a torsion bar which increases radial and angular compliance. A servo valve provided according to the present invention also displays reduced flow forces using a simple, inexpensive valve body in combination with a uniquely configured displaceable spool.

11 Claims, 6 Drawing Sheets

DIGITAL SERVO VALVE SYSTEM

This is a divisional of co-pending application Ser. No. 283,190 filed on Dec. 12, 1988, now U.S. Pat. No. 4,951,549.

TECHNICAL FIELD

This invention relates to servo valves, and more particularly, to digital servo valves used in systems employing compressible or incompressible fluids.

BACKGROUND OF THE INVENTION

Servo valves are well known in the art. These valves are typically used in hydraulic systems wherein a power supply, such as a pump, applies power to a load by means of a fluid circuit. A servo valve is the interface between the hydraulic system and an electrical, mechanical, fluid or other external type of controller. A single stage servo valve comprises an operating spool whose relative position in a ported valve body controls the rate pressure and direction of hydraulic fluid flow. Analog servo valves include internal feedback which can be electrical, force or mechanical in form.

Although analog servo valves are well known in the art, digital servo valve systems are a more recent development. An example of a digital servo valve can be found in the commonly owned U.S. Pat. No. 4,235,156. Disclosed therein is a single stage, spool type, four-way valve which is controlled by an electric DC stepping motor. The servo valve comprises a valve body with an interior cavity having a plurality of fluid channels. A valve operating member, including a spool, is slidable along a longitudinal axis of the interior cavity. Each of the fluid channels is ported to a respective element in the hydraulic circuit. A source of pressure (pump) communicates with a first channel. When the spool is moved along the axis, pressurizing fluid communicates through the fluid with the remainder of the hydraulic circuit, as is well known in the art. A digital controller is employed to provide control signals to a digital stepper motor which is connected to the operative member of the valve such that rotation of the stepper motor output shaft is translated to linear motion of the spool.

Unlike conventional servo valves, the servo valve disclosed in the '156 patent has no mechanical, electrical and/or force feedback. Mechanical servo valves include a provision for a feedback shaft which is operatively connected to the hydraulic load. The feedback shaft returns the spool to the closed or null position of the valve upon completion of the commanded operation. The servo valve disclosed in the '156 patent provides for true digital closed loop operation, and has no analog or mechanical feedback element. Rather, the necessary feedback is provided exclusively by a digital encoder equivalent or transducer that is directly connected to a hydraulic load. The encoder outputs a position feedback signal which is compared with a command signal by the digital controller. The controller provides pulses to the stepper motor dependent on the difference between the command and feedback signals.

As is well known, stepper motors are characterized by a plurality of magnetic detents which oppose output shaft rotation from its present position even if electrical power is removed from the stepper motor. Consequently, if the last command to the servo valve was for a valve open position, the valve will be in that open position when the valve is re-energized. This characteristic of digital servo valves presents a danger to both men and machinery, since the valve will be in an unknown state when electrical power is restored. On the other hand, an analog servo valve will inherently return to the fully closed position if the servo system loses electrical power because in most valves force feedback is used.

Another problem with known digital servo valves is the presence of mechanical backlash which occurs when the stepper motor changes its direction of rotation and displaces the spool in the opposite direction. To accomplish the necessary rotary to linear translation, a grooved helical cam and pin mechanism is configured at one end of the spool. In order to prevent backlash, a spring apparatus operatively connected to the spool exerts a biasing force against the spool. As a result, the pin is held against one of the sides of the cam groove, regardless of the direction of spool rotation. However, under certain conditions, this force can be overcome and produce the undesirable backlash.

Still another drawback of the prior art is apparent with larger servo valves. In general, flow forces developed within the valves increase with the size of the spool and valve body. These flow forces, or Bernoulli forces, oppose the operation of the valve from a null position. The torque required of the stepper motor to controllably displace the spool must correspondingly increase to avoid a situation where the flow forces developed within the valve are greater than the torque capability of the stepper motor. Larger servo valves of the prior art require larger, two-stage hydraulic amplification or more costly stepper motors. Alternatively, flow force can be reduced. However, to reduce flow forces, the prior art discloses a spool and valve body geometry with an extremely complicated "turbine bucket" shape, formed by relieving significant portions of the valve body. This valve body shape is extremely complex, with accompanying machining costs that are too great to be practical. It would be advantageous to have a digital servo valve configured so that flow forces within the valve are substantially reduced, enabling a smaller stepper motor to be used than would otherwise be possible and whose spool and chamber geometry is simple and inexpensive to manufacture.

SUMMARY OF THE INVENTION

An object of the present invention is to provide a digital servo valve system capable of operating either open loop or closed loop.

Another object of the present invention is to provide for a digital servo valve system which can be addressed by an external control apparatus simultaneously with a plurality of other servo valve systems.

Another object of the present invention is to provide for a servo valve having a mechanism for eliminating mechanical backlash that is independent of force applied thereto.

Another object of the present invention is to provide for a servo valve characterized by increased radial and angular compliance of a spool with respect to a valve body.

Another object of the present invention is to provide for a digital servo valve that will return to a closed position upon the loss of electrical power.

Still another object of the present invention is to provide for a servo valve having reduced Bernoulli flow forces.

According to the present invention, a digital servo valve system for controlling a displaceable actuator includes a valve body that has an interior longitudinal cavity with a plurality of channels spaced therealong. Each of the channels respectively communicates with a fluid pressure source, a fluid pressure return and the actuator. A spool located within the cavity is displaceable along a longitudinal axis and is characterized by a plurality of substantially cylindrical lands alternately spaced with a plurality of recessed regions. The spool is cooperatively configured with the valve body to regulate fluid flow in the channel in dependence on the spool's axial displacement. The digital servo valve system also includes a rotary to linear translator which is affixed to the valve body and the spool for translating received rotational displacement to linear axial displacement of the spool. The actuator is configured with a feedback apparatus that provides signals which are indicative of the actuator displacement. A motor is included for providing rotary displacement in response to position command signals. A controller receives displacement signals from the feedback apparatus as well as actuator control signals and computes present actuator parameter values. The controller compares the computed values with preselected actuator parameter values and iteratively determines therefrom the position command signals.

According to another aspect of the present invention, a translation assembly for use in a servo valve includes a spool which is rotatable and translatable along a longitudinal axis and includes a body having an interior cavity which receives the spool. A ball screw mechanism is attached to the spool at a first end thereof for translating into axial displacement, rotation received at an opposed second spool end.

According to still another aspect of the present invention, a servo valve includes a valve body with an interior cavity that has a plurality of fluid channels and receives a spool which is rotatable and translatable about a longitudinal axis of the valve body. The spool is received in an interior cavity of the housing. A rotary means is positioned at a first end of the spool for rotating the spool about the axis. A rotary to linear translator is positioned at an opposed second end of the spool and provides translation of rotary to linear motion. A torsion bar is disposed along the longitudinal axis in an interior cavity of the spool and has opposite ends affixed to the spool first end and the rotary to linear translator end, respectively. The torsion bar provides, relative to the longitudinal axis, radial displacement between the rotary to linear translator and the spool.

According to still another aspect of the present invention, a centering apparatus used with a stepper motor which exerts the torque upon a rotatable output shaft and which has a plurality of positional detents includes a spring for exerting a torque on the output shaft. The spring torque is selected to have a magnitude greater than the stepping motor's non-energized output shaft magnetic detent torque and less than the stepper motor energized torque. A means is also included for positioning the spring about the output shaft to define a null position such that the spring rotates the output shaft to the null position in the absence of the stepper motor torque.

According to yet another aspect of the present invention, a spool for use in a servo valve having a substantially cylindrical interior cavity, includes a plurality of longitudinal cylindrical lands and a plurality of recessed regions adjacent to the lands. A central recessed region has at least one substantially curved end portion abutting an adjacent land, thereby reducing flow forces generated as the valve opens and closes.

DETAILED DESCRIPTION OF THE PREFERRED EMBODIMENT

Figure 1:
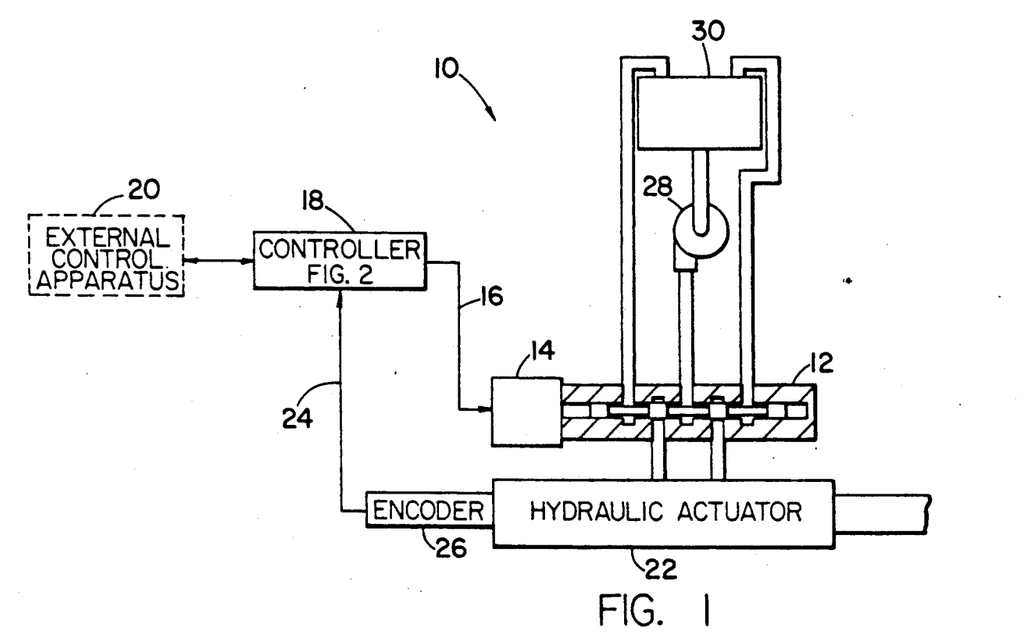
FIG. 1 is a simplified schematic illustration of a digital servo valve system provided according to the present invention.

Referring now to FIG. 1, there is shown in a simplified schematic illustration a digital servo valve system 10. The system includes a digital servo valve 12 which is a single stage, spool type, four-way valve, which as detailed hereinafter, has a ported valve body with a displaceable internal spool. The servo valve is actuated by an electric DC stepping motor 14. The stepper motor receives position command signals on lines 16 from controller 18. As detailed hereinafter, the controller receives actuator control signals from an external control apparatus 20 to operate a linear or rotary actuator, such as a hydraulic actuator 22. By way of example and not limitation, the actuator could be a rotary encoder, linear displacement transducer, or sonic feedback device. The position feedback signals are necessary to allow closed loop operation of the system as provided on lines 24 from encoder 26. As is conventional, the servo valve is configured with a pump 28, which is a source of high pressure hydraulic fluid and a reservoir 30 for the return of fluid. The servo valve selectively provides high pressure hydraulic fluid to control the hydraulic actuator 22.

The exact position of the hydraulic actuator is determined by encoder 26. Unlike conventional analog servo valves, there is no mechanical or electrical feedback provided within the servo valve. As detailed hereinafter with respect to FIG. 3, the controller employs a conventional microcomputer which computes the valve position command signals in accordance with selected control algorithms in dependence on hydraulic actuator parameters, such as position, velocity and acceleration.

A digital servo valve system provided according to the present invention, does not measure and approximate the hydraulic actuator parameters as does a conventional analog servo valve system. Rather, the exact position of the actuator is measured and the actuator's velocity and acceleration determined by the controller, which then commands the actuator to the desired position at the desired rate, compensated for the mechanical deficiencies of the system.

With few exceptions, most closed loop servo valve systems use precise digital accounting schemes and feedback devices to control analog servo valves. An example of attempts to apply digital technology to control systems involving servo valves is found in U.S. Pat. No. 3,621,762 to Yo Ikebe. The prior art control methodology requires conversion of the inherently digital data produced by the digital control system to provide an "analogue" of the required servo valve spool position. Analog servo valves provide an approximation of the desired control signal which is prone to drift unless extra effort is made to compensate for the non-linear signal components.

The digital servo valve system of FIG. 1 is characterized by a single stage, spool type, four-way valve that is controlled by an electric DC stepping motor. Other types of valves, such as three-way valves, can be equivalently used. Those skilled in the art will note that the primary advantage of using a single stage servo valve is that the "lag" that develops between the primary and secondary stages of conventional, two stage analog valves is not present, eliminating the potential instability imposed on the responsiveness of these servo valve systems.

Those skilled in the art will note that since feedback is provided by the servo valve system rather than the valve, a digital servo valve system in accordance with the present invention can comprise one or more conventional servo valves in combination with the digital valve of FIG. 1 where the digital valve acts in a conventional "pilot" stage.

In the present invention, the stepping motor is coupled directly to the spool portion of the servo valve, thereby providing true digital control of the direction and flow of the hydraulic fluid. Depending upon the size and shape of each orifice in the valve, each step that the stepper motor is commanded to move will set a new flow through the valve. The ability to predict the change in flow for each spool position has simplified modeling of the valve and characterization of the system in general. With the present digital servo valve, the burden of control is allocated to the controller software which can be adapted to the needs of a particular application.

As a true digital actuator, a DC stepping motor has the obvious advantage of being easily interfaced to any microcomputer based system. Other reasons to employ a stepper motor are an inherently digital output with resolution, typically between 0.0018° to 15°, magnetic detents which are precise and repeatable, variable velocity and acceleration ranges are greater and more economically feasible than with analog actuators and the capability of accomplishing all of these functions without an additional minor control closed loop.

A stepper motor is a DC brushless two-phase motor which provides incremental rotary motion through an output shaft in response to current levels from an external source. This type of motor has an inherent magnetic detenting action and, in a digital servo valve, provides a stable valve spool position without the need of a feedback transducer, or as in the case of analog servo valve, any mechanical feedback provisions. Electrically a typical stepper motor may be run in one of three modes, full step (200 positions per revolution), half step (400 positions per revolution) and microstep (fractional increments of full step).

This type of driver circuitry allows the controller to directly select the level and polarity of the current in both of the stepper motor windings. If the controller maintains a constant current level while switching command signal polarity, the motor will make a full or half step for each advance of the respective sequence. Reversing the sequence causes the stepper motor to rotate in the opposite direction. When the currents in the motor windings are controlled relative to one another, the controller can use the stepper motor to make a fractional or "micro" step. While microstepping, the motor winding currents have a rough sine and cosine relationship that is adjusted in a conventional manner to compensate for the harmonic distortion of the stepper motor's torque versus displacement curve.

Typically, the bipolar chopper drive circuitry is configured as two conventional "H" bridge circuits that allow the current to be reversed in each winding. The current flowing in a each winding is sensed and chopped to maintain a command current level to rotate the motor output shaft one or more microsteps. Although the current level of an undivided single winding may drop to zero, the opposite winding will still produce enough torque to maintain an average output of, at least, seventy percent. In the preferred embodiment, the stepper motor is configured to provide a maximum of 128 microsteps per full step, yielding 25,600 positions per revolution. For most applications, a 32 microstep resolution will provide 0.06 percent control full flow through the servo valve.

Figures 2, 9:
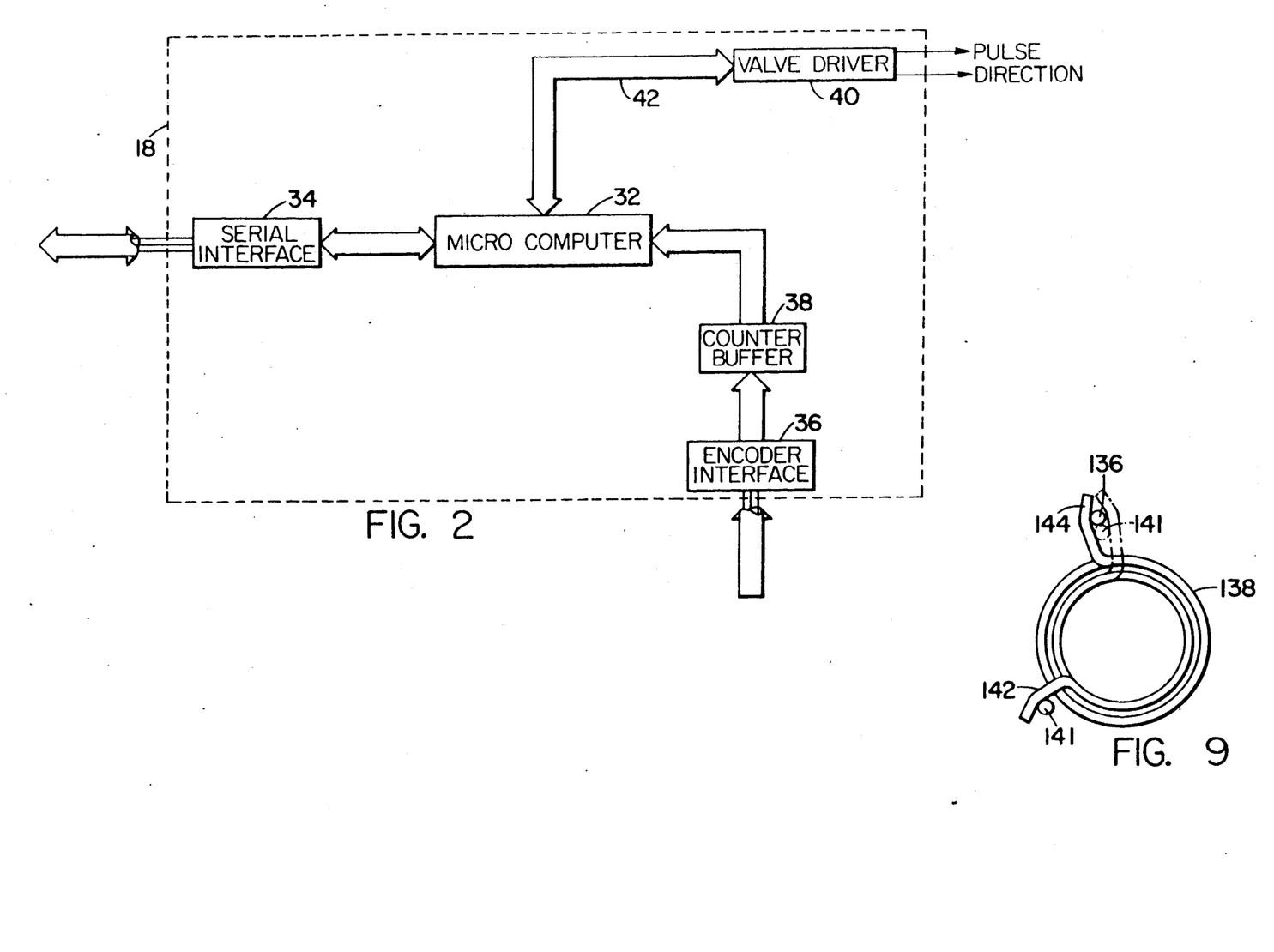
FIG. 2 is a detailed schematic illustration of the controller of FIG. 1.
FIG. 9 is a perspective illustration of a portion of a valve centering apparatus of the digital servo valve of FIG. 8.

Referring now to FIG. 2, there is illustrated in simplified, schematic form the controller 18 of FIG. 1. The controller is configured with pre-engineered software modules specific to an application's requirements. The controller then provides for either open or closed loop control of the actuator's velocity, position or force. The controller may be used in a stand-alone mode or as a direct interface to a host computer or other external control apparatus.

The controller 18 includes a microcomputer 32 typically based on a type 8051 microprocessor, and has such conventional computer hardware and software as is necessary to perform the functions described herein. The microcomputer receives command signals from the external control apparatus at serial interface 34, which is preferably a type RS232 or RS485 interface.

The microcomputer also receives digital or analog feedback signals from the encoder 26. Depending upon the feedback device employed, encoder interface 36 and counter buffer 38, respectively digitize and buffer the received feedback signal. Typically, the feedback signal can be an analog source, a two channel encoder such as an incremental optical encoder, a linear sonic probe or a conventional resolver. For example, a rotary or linear optical encoder will produce a serial stream of square wave pulses that are representative of change in position of the hydraulic actuator. The feedback signals will then comprise two discrete channels that are 90° out of phase so that the controller may determine both position and direction. A third channel provides a signal for marking each shaft revolution, or for determining a home position. An encoder which provides signals of this type is a two channel incremental encoder with a 90° quadrature marker. Alternatively, an analog encoder may be substituted. For analog encoder output signals, the encoder interface 36 will include an appropriate analog to digital (A/D) connector. For the preferred two channel digital encoder described hereinabove, the controller monitors the encoder output signals and stores a value in memory which represents either present velocity or the absolute number of encoder pulses received.

With the preferred embodiment, up to 15 individual servo valves, with their respective controllers, may be connected to a single RS232 serial port. If the digital servo valve system is configured with a plurality of other servo valves, it is preferred that the communications protocol be such that no controller may provide signals back to the external host without a specific command, i.e., each controller will not initiate communications on their serial port. The microcomputer checks each command for the structure (syntax) of the message to ensure that there no mistakes in the signal received. If an error is detected, the message is discarded and an error message is output by the microcomputer.

The controller 18, also includes a valve driver 40, which receives pulse and direction signals from the microcomputer on line 42. The valve driver is conventional and serves as an interface between the mircocomputer and the stepper. In response to the received signals, the valve driver generates the corresponding position command signals for the stepper motor.

Figure 3:
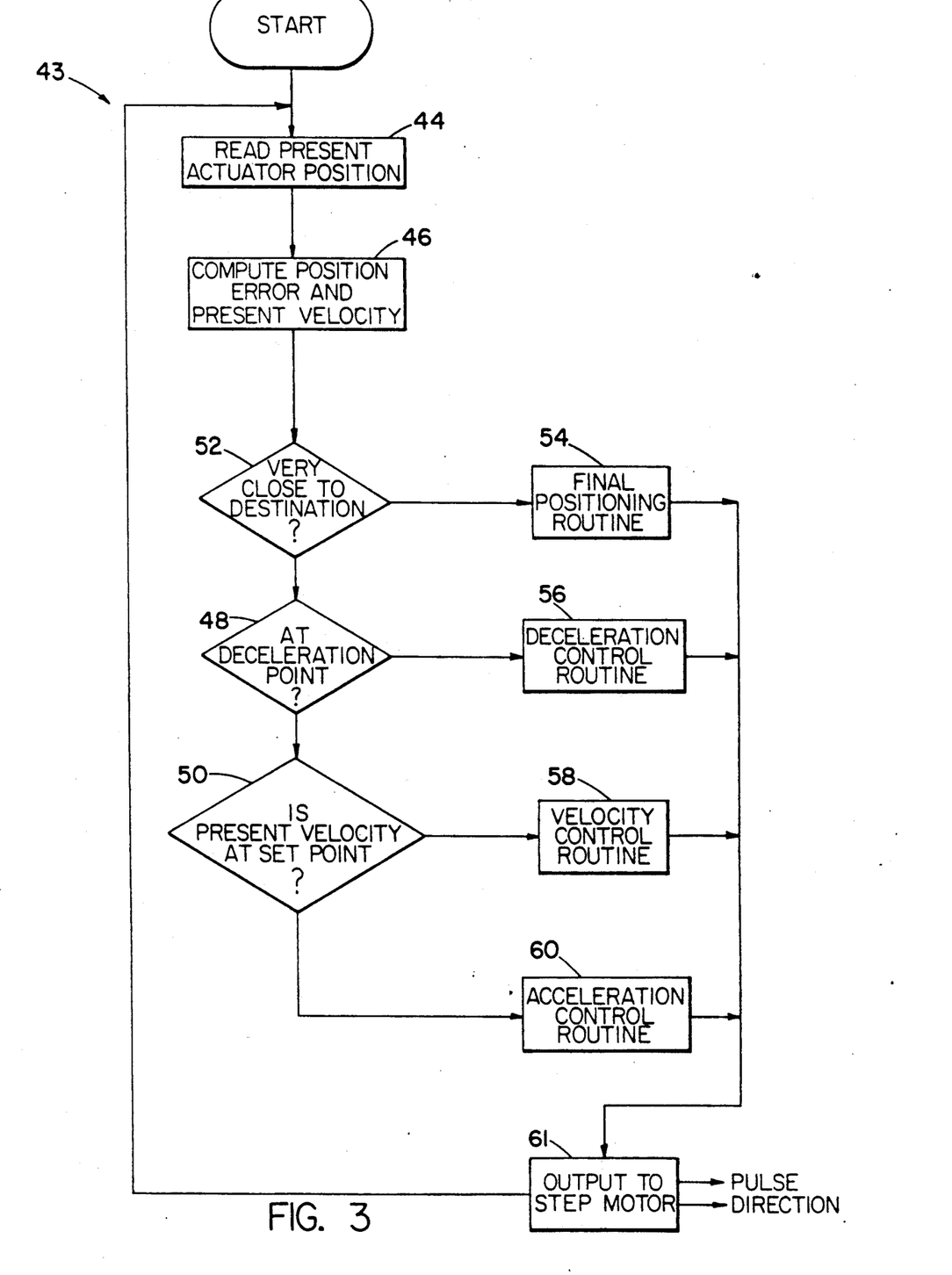
FIG. 3 is an illustration detailing a closed loop control algorithm used with the controller of FIG. 2.

FIG. 3 is a diagrammatic illustration of a control algorithm 43 used by the controller of FIG. 2. By incorporating a microcomputer with the digital servo valve, control capabilities are available in the present digital servo valve system which otherwise would not be possible with analog servo valve control systems. The most powerful capability is the computer's ability to select, in real time, different control strategies to solve specific actuator control problems. The algorithm of FIG. 3 is illustrative of four possible control branches based on three measured actuator parameters within a single iteration.

For purposes of illustraton only, the control algorithm of FIG. 3 is assumed to be configured with an application having the following parameters: linear actuator, a feedback device having a resolution of 1000 pulses per inch displacement, a positional system with a pre-set destination and a constant acceleration value of compared with velocity. Friction is assumed to be the predominant actuator load, and the algorithm is processed at a fixed rate.

Initially (Block 44), the controller reads the present position of the actuator as indicated by the value of the encoder signal received by the microcomputer. At Block 46 the microcomputer computes actuator position error and actuator present velocity values in order to select a control sub-routine. The computed value of actuator position error is the difference between the present hydraulic actuator (load) position and the desired final position as indicated by the value of the actuator control signal. Since the algorithm processes at a fixed rate, the actuator velocity is extracted by taking the difference between the present position and the previous position. A value for acceleration can similarly be found by computing the rate of velocity change.

For these computed parameters the controller establishes both a deceleration position and a velocity setpoint (Blocks 48 and 50). The algorithm compares the computed present position to the commanded position to determine whether the actuator is approaching the final commanded position (Block 52) or has reached the deceleration position of setpoint velocity. Once the actuator position is within a selected distance from the commanded position, the controller selects a final positioning routine (Block 54). The controller may also simultaneously execute a deceleration control routine (Block 56), a velocity control routine (Block 58) or an acceleration control routine (Block 60), dependent on the magnitude of the respective parameters.

In the preferred embodiment, the controller employs a variation of a conventional proportional/integral/derivative (PID) loop control, which is modified according to the specific application. As is conventional, the microcomputer computes the three (proportional - integral - derivative) components of the output signal separately. These are added together and are summed with the actuator command signal to produce the command signal output to the valve driver (Block 61).

A controller which provides output-feedback or classical control uses a measurement of the system output signal as a feedback source. This single measurement is the system parameter that is being controlled. A feedback signal is compared against a desired command input signal and an error signal is generated. The error signal is processed through a control algorithm whose output signal will be a desired valve position.

There are many different control algorithms which provide a classical control. The most popular is a proportional-integral-derivative (PID) controller. Another algorithm that may be employed uses the conventional phase-lead technique. Both algorithms use the error signal to determine a valve position which achieves the desired system performance.

Alternately, the present controller may be configured in accordance with state-space theory, or modern control theory, which assumes that more system parameters than just the output signal are available for measurement. Each parameter, or state variable, is measured and compared against a desired value, and an error signal is developed for each state variable. A gain value, specifically selected for each state variable, is multiplied by the error signal. The valve position is the sum of the product of the gain and error signals from each state variable.

The selection of the gain values determine the way the system will respond. Emphasis can be placed on a certain state variable to heavily penalize any error in that variable. Methods to compute these gains are complex and usually require computer algorithms and routines to solve. Two known examples of such methods are linear quadratic regulator (LQR) and pole placement.

State-space algorithms require that all state variables be available for measurement. If all the state variables are not available for measurement, then it may be necessary to estimate a variable. An estimator or observer variable is constructed by the algorithm by calculating the variable from other variables in the system. The estimated variable is then treated as if it were actually measured. Different types of conventional variable estimators include Lluenberger observers and Kalman filters.

For the preferred system of FIG. 3, the acceleration control sub-routine 60, receives an input value that corresponds to the maximum value of velocity increase allowed per algorithm iteration, plus a value which is indicative of the present rate of change of velocity. The controller generates position command signals that modify the actuator acceleration such that the tendency of the actuator to overshoot the maximum acceleration as the system approaches maximum velocity is damped out. A similar capability is incorporated into the deceleration sub-routine for computing the values of actuator deceleration.

The exemplary velocity sub-routine configures the servo valve to maintain a rate of encoder feedback pulses equal to the present velocity set value. A value of the present velocity error is multiplied with an input value (velocity gain) that will maintain the actuator velocity within an acceptable band. Depending upon the load, this routine incorporates additional control functions, such as the conventional integral or derivative control functions detailed above.

A simplified final position sub-routine provides a signal to the stepper motor which is proportional to the amount of position error multiplied by the position value corresponding to the actuator command signal (position gain). Since most mechanical systems have a highly non-linear "stick slip" at extremely low speeds, a special consideration must be incorporated into the sub-routine when moving the actuator to its final commanded position. For example, if a force is applied to the actuator which is only proportional to the position error, the digital servo valve system may not move the actuator due to this "stick slip". If the control algorithm were to sum (integrate) this error in successive iterations, the valve would eventually open sufficiently to displace the actuator. It is also possible that the overall response time of the mechanical system (the actuator) would cause enough delay to allow the servo valve to apply too much force and, therefore, overshoot the commanded position. However, with a digital servo valve system provided according to the present invention, the microcomputer allows the system to adapt, recognize and compensate any actuator overshoot by limiting the magnitude of allowable error and/or incorporate a time delay, of sufficient magnitude, to provide for the mechanical components of the system to respond.

Figure 4:
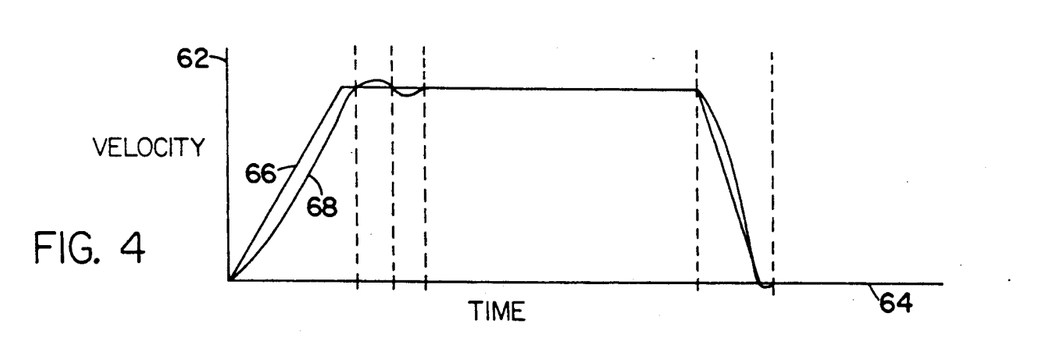
FIG. 4 is a diagrammatic illustration showing the relationship between computed and measured actuator velocity.
Figure 5:
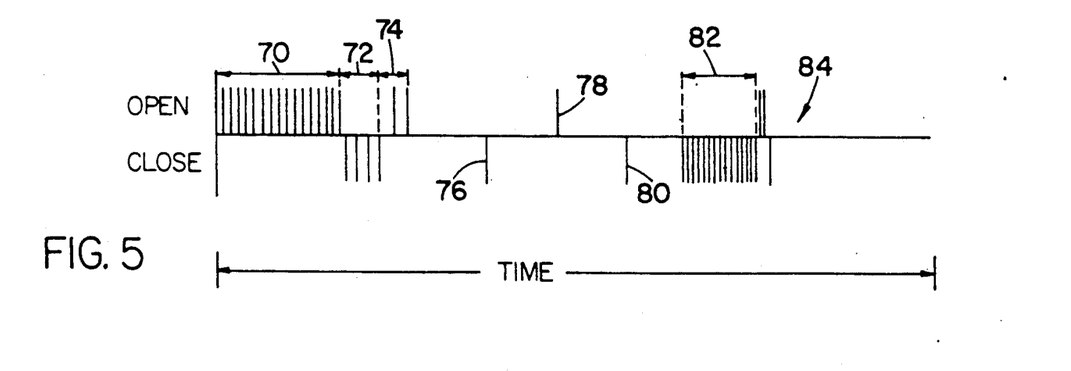
FIG. 5 is a diagramatic illustration of the digital position command signal corresponding to the actuator velocity of FIG. 4.

The relationship between position command signals required to displace the actuator and the actuator velocity can be seen by referring simultaneously to FIGS. 4 and 5. FIG. 4 is a diagrammatic illustration showing the relationship between computed and actual actuator velocity during a commanded operation. In FIG. 4, axis 62 corresponds to the actuator velocity, while axis 64 corresponds to time. Curve 66, is indicative of the signal corresponding to commanded actuator velocity, while curve 68 corresponds to the measured velocity of the actuator as it is being displaced.

FIG. 5 is a diagrammatic illustration of the position command signal corresponding to the actuator velocity profile of FIG. 4. Initially, the stepper motor is rotated a selected number of steps which corresponds to a desired actuator velocity (region 70). As the actual measured velocity exceeds the velocity commanded, the stepper motor is oppositely rotated (region 72). This subsequently produces a small undershoot (region 74) requiring the stepper motor to be advanced (pulses 76, 78 and 80) to maintain the actuator at its commanded velocity until the termination of the computed time period, at which point the stepper motor is rotated to close the servo valve, as illustrated at region 82. The algorithm uses the encoder feedback signals to compensate for any overshoot or undershoot in the valve closing process (region 84).

Figure 6:
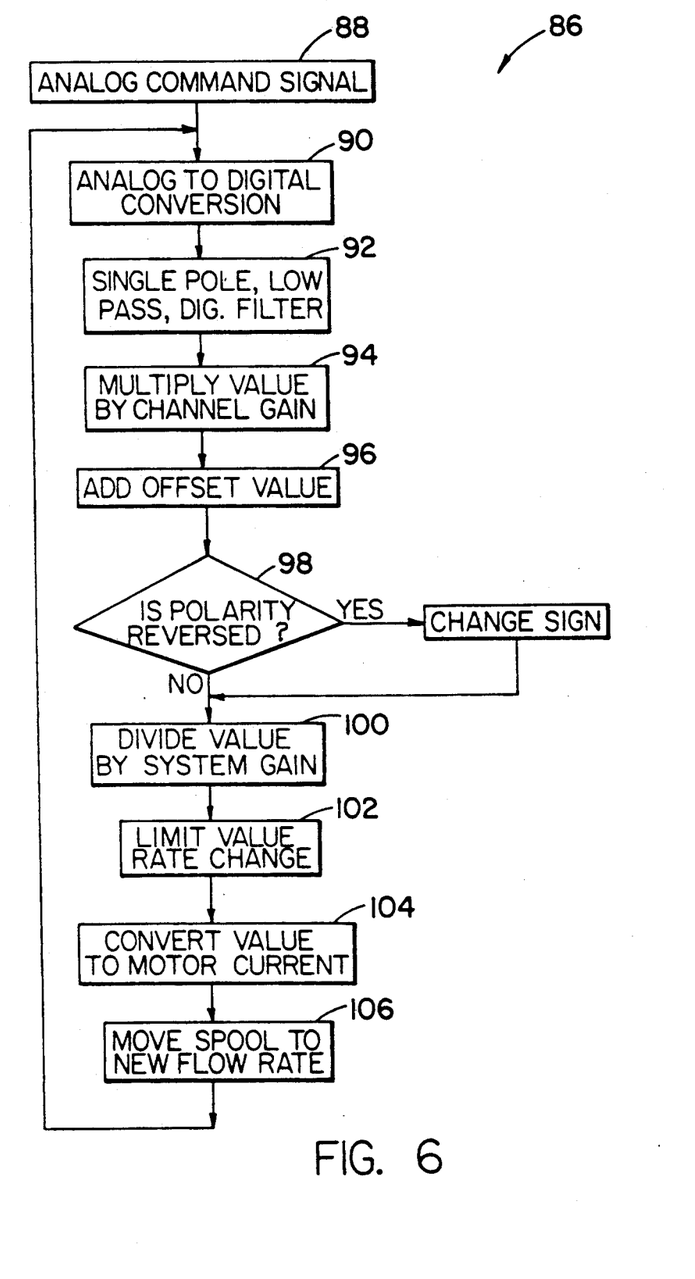
FIG. 6 is a detailed illustration of an open loop control algorithm used with the controller of FIG. 2.

A digital servo valve system provided according to the present invention, can also be configured to run in a "open loop" mode to control actuator velocity or position, as illustrated by open loop control algorithm 86 in FIG. 6. The controller can be used in conjunction with other digital servo valve systems which have the ability to monitor an appropriate feedback sensor and correspondingly adjust the actuator control signal, thereby closing the loop. In an open loop valve position, the actuator control signal can be analog signals having a typical voltage magnitude of between zero and ten volts, or a current magnitude between four and twenty milliamps. Digital commands may also be entered via the serial communication port. The specific voltage and current ranges can be set in the preferred embodiment by a combination of DIP switches and jumpers on the controller. The analog actuator control signal (channel A) may be differential or single ended. In the preferred embodiment, the inputs are read by a ten bit successive approximation analog to digital converter with a conversion time of approximately 20 microseconds. Sample up-date time is on the order of 2 milliseconds or better. Analog actuator control signals are used to sense velocity, position or force by the use of conventional tachometers, linear and rotary potentiometers, load cells, pressure transducers or analog outputs from other controllers. Analog actuator command signals may be provided by a simple joystick with analog output, process controller, numerical controller or programmable logic controller. In any case, the controller will process the actuator command signal to position the valve spool at the desired the flow volume and direction.

Upon receipt of the analog actuator command signal indicated schematically at block 88, the data is converted to digital format (block 90) whose output is passed through a single pole low pass filter, having a programmable cut-off frequency between five and two hundred and fifty hertz (block 92). At block 94, the filter output signal is summed with the content of a conventional offset register in the microcomputer. The sum of the filter and offset is then multiplied by a selectable channel gain (block 96). If a polarity reverse command has been asserted affirmative, then the sign of the signal present value is reversed. This signal value is now divided by the system gain (block 100). The controller is configured to read analog signals having voltages of between zero to ten volts, plus or minus five volts and plus or minus ten volts. Unipolar signals are converted with a ten bit, accuracy (one part in 1024). Bipolar signals are converted with a nine bit, accuracy (one part in 512).

The controller may also be configured to received current signals of between four and twenty milliamps. The controller will convert these signals with a ten bit, plus or minus one bit, accuracy (one part in 820). The signal value divided by the system gain is processed by the microcomputer to limit the rate of change of the summed signal (block 102). This rate limited value is then converted at block 104 into the two-phase currents which comprise the stepper motor position command signal. Consequently, the stepper motor moves the spool block 106 to a position which is proportional to the signal applied to the analog command signal (block 88) input.

When the controller is run open loop, the following considerations must be addressed: (1) the effect of the input low pass filter on system response, (2) the effect of system gain on actuator stability, and (3) the effect of valve flow rate on actuator (load) acceleration. Initially, it is preferred that the input filter frequency range be between five and two hundred and fifty hertz. It is best to operate at the highest frequency possible, to assure that the input actuator control signal is reproduced accurately. If the immediate environment has numerous sources of electrical noise, the frequency should be lowered to reduce or eliminate those effects. Both the analog channel gain and system gain will affect the proportional reaction that the servo valve will provide in response to the magnitude of the analog actuator control signal. For higher value of channel gain, the valve will supply more flow for the same level of actuator command signal. Conversely, lower gain values provide less flow for the same input signal level. System gain operates in the opposite manner; higher values produce lower servo valve flows, and lower values produce higher flows. In either case, increasing the amount of flow with the same level of actuator command signal input may cause the actuator to become unstable. Satisfactory operation is usually obtained if both gains are adjusted to a point where operation is approximately correct and then reduced between 5% and 10% of those gain settings.

The servo valve rate adjustment effectively provides control of load (actuator) acceleration by limiting the rate at which the valve responds to the analog command signal input. The value which provides a smooth starting and stopping of the load is preferred.

Figure 7:
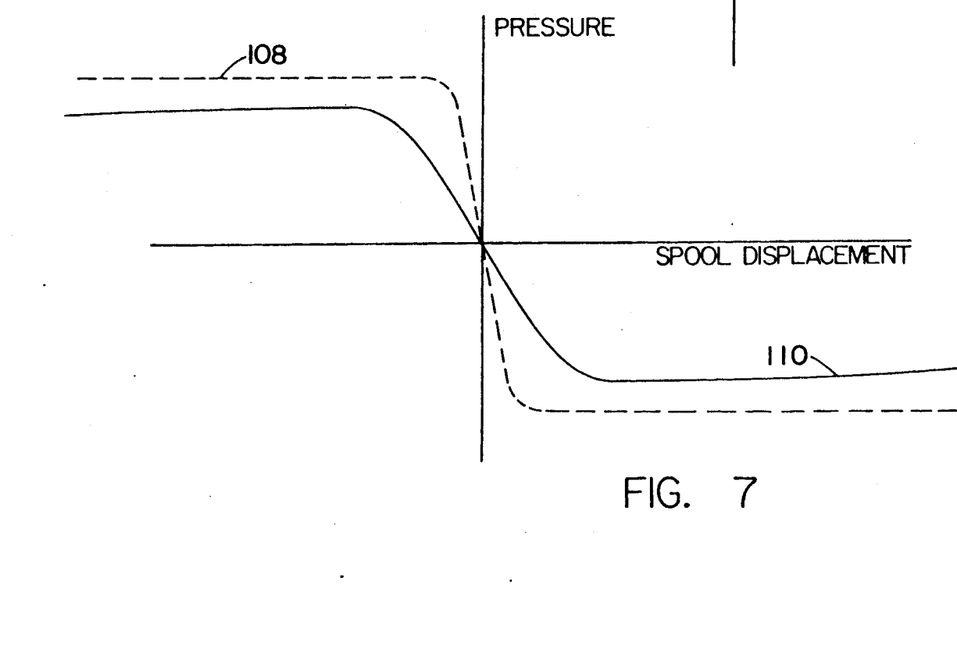
FIG. 7 is a diagrammatic illustration showing a pressure-gain relationship of the digital servo valve system of FIG. 1.

FIG. 7 illustrates the pressure-gain relationship characteristic of a digital servo valve system provided according to the present invention. Curve 108 corresponds to the pressure-gain relationship of a prior art analog servo valve system, while curve 110 illustrates the pressure-gain relationship problem according to the present invention. Typically, prior art systems configure the servo valve to reach the maximum value of gain with as small an increase in pressure (i.e. input voltage) resultant as possible. As a result, the pressure-gain relationship changes very rapidly around the closed valve position. Prior art analog servo valve systems attempt to make the transition between zero and maximum pressure-gain in as short a spool stroke as possible because of the inaccuracy or lack of resolution inherent to the design of analog servo valves. However, with the digital servo valve system of FIG. 1, the stepper motor provides accurate and repeatable values of gain as a function of pressure. In the past, stepper motors have been used for those applications that require multiple or continuous rotation of the stepper motor output shaft. However, in the present invention, the stepper motor is required to turn a fraction of one revolution to accomplish the desired valve displacement. The controller of the present invention is configured to utilize the greater precision offered by the microstep capabilities of the stepper motor. Consequently, the pressure-gain region can be extended to encompass as much gain as desired without a corresponding loss in accuracy. This is a function of resolution as one part of 1,000 is average. With the preferred microstepper motor and controller resolution exceeds one part out of 128,000.

Figure 8:
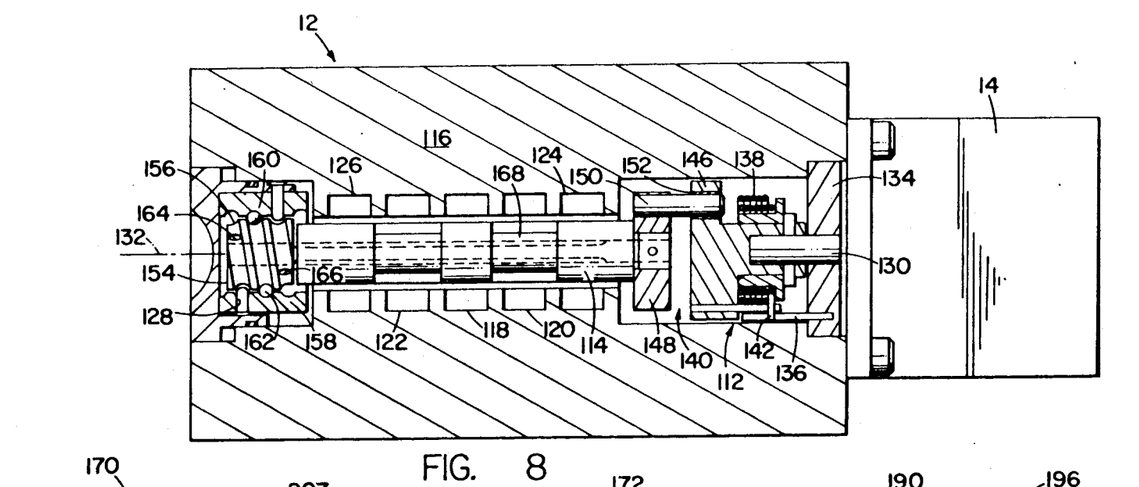
FIG. 8 is a sectional illustration of the digital servo valve of FIG. 1.

FIG. 8 is a sectional illustration of a portion of the digital servo valve system 10 of FIG. 1. Illustrated therein is stepper motor 14 which is configured with servo valve 12. A return apparatus 112 is configured at one end of a conventional spool 114. The spool is slidably disposed within an interior cavity of valve body 116 in a conventional manner. The cavity has a plurality of fluid channels which are ported to other respective elements in the fluid current of FIG. 1. A central chamber 118 is configured to receive pressurized fluid, such as hydraulic fluid, or air in pneumatic applications. Channels 120 and 122 open to the actuator, while channels 124 and 126 are ported to the return fluid reservoir.

As detailed hereinafter, the spool is configured with a ball/screw rotary to linear translator 128 at the end of the spool remote from the stepper motor for converting the rotation of stepper motor output shaft 130 to linear spool displacement along axis 132. The output shaft of the stepper motor rotates the spool and rotary to linear translator together as an assembly. The spool is simultaneously displaced along axis 132 uncovering the several fluid channels in the valve body.

In prior digital servo valve systems, the absence of mechanical feedback results in a servo valve which remains in the last commanded position if electrical power is removed from the digital servo valve system. The digital servo valve system of FIG. 1 overcomes the disadvantages of prior art digital servo valves by including a return apparatus 112 which in the preferred embodiment comprises a bi-directional rotary null spring mechanism. The mechanism includes a sealing plate 134 having a null pin 136 extending therefrom. A coiled rotary spring 138 is positioned about the stepper motor output shaft and is affixed to a coupling device 140 having pin 141. The spring (see FIG. 9) is characterized by tabs 142 and 144, which extend out to contact the null pin. The mechanism is configured such that the spring produces a force opposing the rotation of the stepper motor output shaft in both a clockwise or counter-clockwise rotational direction. The null pin is preferably positioned to correspond to the servo valve fully closed position.

The magnitude of the spring torque exerted by the spring return force about the output shaft is selected to be greater than the force of the magnetic detent and less than the torque provided by the stepper motor. As a result, the stepper motor output shaft will operate free of any interference on the part of the spring. However, if there is an electrical power failure or failure by the controller electronics, the stepper motor output shaft will always be mechanically returned to the null position, thereby closing the valve and ensuring that when the power is returned, there is no damage to equipment or personnel.

In FIG. 9, the preferred embodiment of the spring is seen to comprise music wire of approximately 0.047 inch diameter and is configured with a preload of approximately 8 ounce inch, at 90°. As shown therein, spring tabs 142 and 144 are on opposite sides of the null pin. The spring comprises approximately 4 coils, having an outer diameter of approximately 0.8 inches and an inner diameter of approximately 0.6 inches. The valve closed position corresponds to that position where pins 136 and 141 are in registration.

The coupling device 140 is provided for interfacing the spring with the spool and includes a pair of opposed coupling journals, 146 and 148. Journal 148 is fixedly connected to the spool and has an offset crank pin 150 which is longitudinally slidable in a receiving mechanism 152 in journal 146. The spool is gimbal mounted with the receiving mechanism to allow radial or angular as well as axial movement.

The servo valve of FIG. 1 also includes a ball/screw mechanism 128 which provides rotary to linear translation. The ball/screw mechanism is characterized by an inner member 154 attached to a displaceable valve element, such as the spool. The inner member has a helical groove 156 configured on its outer surface. The ball/screw mechanism comprises outer housing 158, which has an inner cavity that has a grooved surface cooperatively configured with the inner member outer surface, such that a plurality of balls (e.g. ball 160), tightly fit in helical channel 162 formed by the two cooperative surfaces with a clearance therebetween of approximately 0.0001 inch. As is well known, rotation of the inner member causes simultaneous longitudinal displacement. As a result, the balls traverse about the helical channel in one direction when the inner element/spool assembly is rotated counter-clockwise and in the opposite direction when the assembly is rotated clockwise. This modification proves advantageous in many ways. The lack of multiple turns obviates the need for a conventional external recirculation tube. The balls are held in the helical channel by mechanical stops 164 and 166.

Conventional ball/screws comprise many turns and, therefore, require an external return tube to allow the balls to recirculate. However, a ball screw mechanism provided according to the present invention is characterized by approximately one complete revolution of the helical channel. More than one turn is not needed because the digital servo of the preferred embodiment only rotates about one full revolution in either direction for complete valve operation. By limiting the number of rotations of the ball screw to only one, the digital servo valve is then characterized by enhanced compliance away from the displacement axis. That is, the ball screw inner member may be somewhat displaced relative to the outer ball screw housing from the displacement axis (radial compliance) as well as having a distal end of the spool slightly displaceable relative to the ball screw end (angular compliance). Known multi-turn ball/screws have virtually no radial compliance or angular freedom. Consequently, if a many-turn, conventional ball/screw were employed in the present application, the lack of radial compliance would frustrate smooth operation of the digital servo valve.

Most importantly, the ball/screw mechanism provided by the present invention eliminates the backlash inherent with prior mechanical servo valves. As described hereinabove, servo valves of the prior art used a spring to provide a rotational and axial biasing force which would preload the operating member of the valve to avoid backlash when rotation was reversed. However, for certain applications where the fluid channels in the servo valve are larger, the torque exerted by the spring can be overcome. With a ball/screw mechanism provided by the present invention, the amount of backlash present is independent of the force applied to the spool and is only a function of the physical parameters of the helical groove and balls. The amount of backlash can be eliminated by configuring the mechanism with closer tolerances. Significantly, the elimination of mechanical backlash can be achieved without loss of radial or angular compliance.

Radial and angular compliance of the components of the digital servo valve provided according to the present invention is greatly increased by internal torsion bar 168. The torsion bar is located within an interior central cavity of spool 114 and extends longitudinally from coupling journal 148 where it is rigidly fastened. At the other end of the spool, the torsion bar exits from the spool central cavity and is fixed to the rotary to linear translator, which is the preferred embodiment ball/screw mechanism 128. The diameter of the spool central cavity is selected to be larger than the diameter of the torsion bar to provide clearance. In addition, the spool in a digital servo valve provided by the present invention is fastened to the rotary to linear translator (ball/screw mechanism) only via the torsion bar. As a result, a significant amount of compliance can be introduced to the spool assembly, but without any mechanical backlash or other imprecision in the longitudinal displacement of the valve. Although, in the preferred embodiment, the spool is configured with the torsion bar fixed at the coupling journal 148, those skilled in the art will note that the spool can alternately be fixedly mounted to the rotary to linear translator with the radial compliance introduced at the spool/coupling journal interface.

Figure 10:
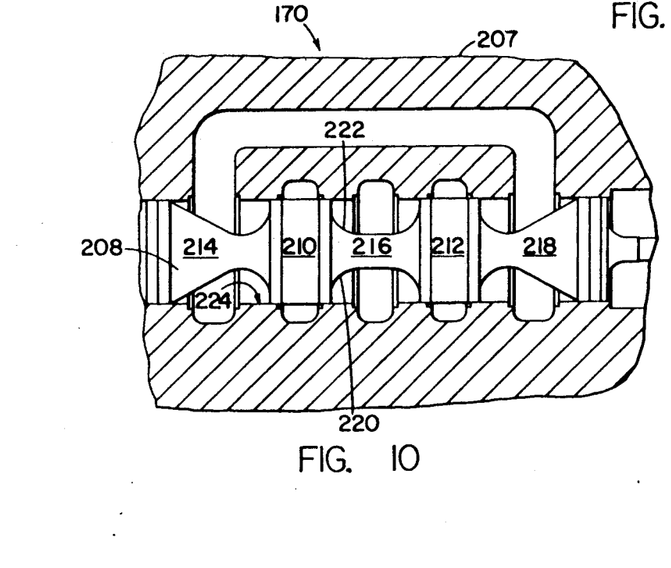
FIG. 10 is a sectional illustration of a portion of an alternative servo valve provided according to the present invention.

FIG. 10 is a sectioned illustration of a portion of an alternative digital servo valve 170 provided according to the present invention, characterized by reduced hydraulic reaction or Bernoulli forces. As is well known in the art, flow induced forces, or Bernoulli forces, which act on the valve body and spool are generated as a result of fluid flowing in the fluid chambers and through the valve orifices. The steady state flow force produced by flowing fluid has been found to be directly proportional to the orifice area gradient pressure drop as well as the spool displacement, and always acts to close the orifice. The Bernoulli force is analogous to a centering spring on a valve because the force is dependent upon valve position. The steady state flow force is also a function of the diameter of the servo valve spool. Conventional hydromachanical servo valves are typically stroked or displaced by a mechanical source with ample force so that, by comparison, the magnitude of the steady state flow force is not significant. However, with digital servo valves, the stepper motor has distinct force limitations, and the steady state flow force becomes more important in larger diameter spool valves. Efforts in the past to address this problem have focused on (1) reducing the steady state flow force by using a two-stage, two-spool valve configuration or, (2) configuring the spool and valve body geometry to provide for flow force compensation. Adding an extra spool obviously raises the cost of servo valve manufacture substantially and is undersirable for other reasons as well, such as the more complex packaging and greater power required.

Figure 11:
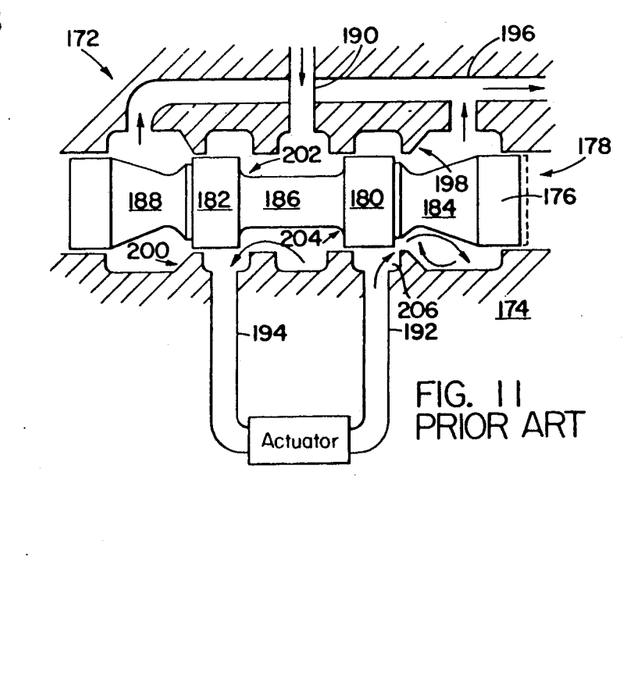
FIG. 11 is a simplified schematic illustration, partially in section, of a prior art servo valve.

An example of a known servo valve with flow force compensation is presented in FIG. 11. Illustrated therein, is a portion of a servo valve 172 having a valve body 174 and a spool 176 arranged in a central cavity 178 of the valve body configured in a conventional four-way manner. The spool comprises a plurality of cylindrical lands 180, 182 with alternating recessed regions 184, 186, 188 which will provide fluid from a supply fluid channel 190 to the actuator via channels 192, 194 when the spool valve is displaced. Also, fluid will be returned via channel 196 and to a reservoir to complete the circuit.

In order to compensate for the flow force, servo valves of the prior art have added forces which oppose the Bernoulli forces. For example, servo valve 172 has additional recirculation lands or negative force ports 198, 200 in the valve body for force compensation.

As spool 176 is displaced, fluid enters the central chamber and produces a jet force normal to the plane of the moving fluid. The jet force has an equal and opposite reaction force given by Newton's third law which can be resolved in two orthogonal components; one acting parallel to the displacement axis of the spool and the other perpendicular thereto. The lateral or radial component of the reactive force tends to push the valve sideways against the valve body and cause sticking. This force component is compensated however, by locating the valve port symmetrically about the spool. The axial reaction force component is not compensated and acts in a direction to close the spool.

In order to generate a forced directed opposite to this axial reaction force component, the valve spool and the valve land are configured to provide some recirculation of the fluid as shown. Spool 176 is characterized by a central recessed region which has a substantially rectangular profile at the interfaces 202, 204 with adjoining lands 180 and 192 in flow forces. As shown in FIG. 11, the interfaces 202, 204 possess a slight tooling curvature but are nevertheless substantially rectangular. The tooling curvature does not alter the magnitude of the axial flow force. Outer recessed regions 184 and 188 have a curved geometry that is complementary to the negative force ports 198 and 200. Fluid entering the channel 206 recirculates generating a flow force having an axial component oriented opposite to that generated by the entering fluid. Although this additional force helps compensate the flow induced force, it requires extensive and precise machining of the land surfaces.

As illustrated in section in FIG. 10, servo valve 170 provided according to the present invention, is characterized by a valve body 207 and a spool 208 with substantially cylindrical lands 210, 212 with alternating recessed regions 214 and 218 having a complementary geometry which provides lower net flow forces than is possible with conventional spools. With lower net flow forces, no compensation forces are needed. Central recessed region 216 is characterized by end portions 220, 222 having a radius of curvative which is selected to orient the fluid jet at a substantially greater angle from the displacement axis than would otherwise occur with conventional, substantially rectangular profile lands. Outer recessed regions, 214 and 218, are mirror images of each other, and are characterized by an interior end having a radius of curvative which is substantially the same as the radius of curvature of the central recessed region end portions. The curvature of the end portions of the central recessed region provide for reduced flow forces allowing valve body cavity 224 to have simple, cylindrical fluid channels. The resulting servo valve is substantially reduced in overall cost, since none of the elaborate, expensive negative force ports or recirculation fluid chambers are needed.

Figure 12:
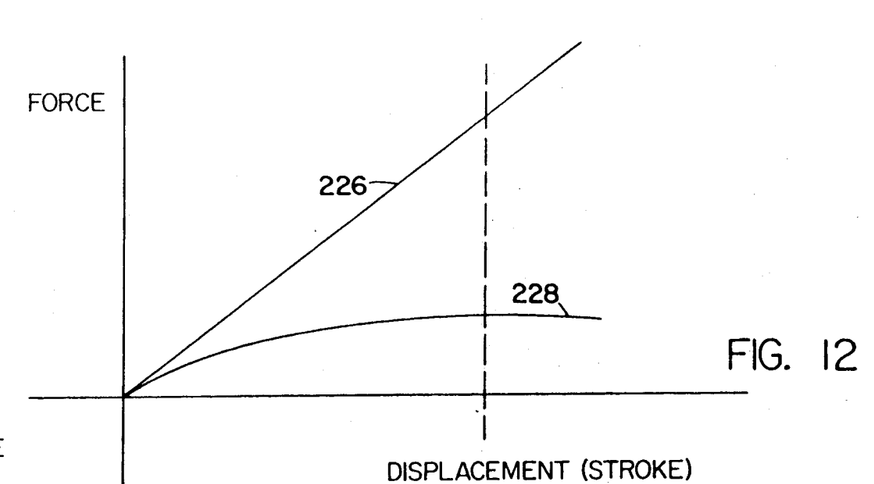
FIG. 12 diagrammatically illustrates the force/displacement relationship for a prior art uncompensated servo valve and a servo valve provided according to the present invention.

The reduction in flow forces provided by a valve spool of the present invention, is substantial as can be seen by reference to FIG. 12. As is well known, uncompensated valves have a flow force which increases with increasing valve stroke (curve 226). However, where the present valve spool is used in combination with a simple valve body having a substantially cylindrical fluid channels, the force required (curve 228) is no longer a function of valve stroke, but reaches a maximum which is, typically, 20% of the maximum needed force in an uncompensated servo valve.

Similarly, although the invention has been shown hereinabove with respect to a preferred embodiment, those skilled in the art will note that certain additions, substitutions and deletions thereto, can be made therein without departing from the spirit and scope of the present invention. Specifically, the invention has been described with respect to an embodiment utilizing hydraulic fluid. Those skilled in the art will note that the present invention is easily adapted for use in pneumatic applications with appropriate substitutions of hardware and software.

We claim:

1. A translation assembly for use in a servo valve, comprising:
    a spool rotatable and translatable about a longitudinal axis;
    a body having an interior cavity for receiving said spool;
    a ball/screw means attached to said spool at a first end thereof for translating rotation received at an opposed second spool end into axial spool displacement,
    said ball screw means comprising an inner member affixed to said spool at said second spool end;
    an outer hollow member affixed to said body configured to receive said inner member;
    said inner member having an outer surface and said hollow member having an opposed inner surface both configured to form a helical channel along said axis extending thereabout approximately 360 degrees;
    a plurality of displaceable balls located in said channel, said balls configured to substantially conform to said channel; and
    said ball screw means being connected to said spool by torsion bar means, disposed along said axis in an interior opening formed in said spool for providing, relative to said axis, displacement between said ball screw means and said spool.

2. A translation assembly as defined in claim 1 further characterized by said spool interior opening being substantially cylindrical, said spool comprising;
    a plurality of longitudinally spaced substantially cylindrical lands,
    a plurality of recessed regions adjacent to said lands, said recessed regions having at least one substantially curved end portion abutting an adjacent land.

3. A translation assembly as defined in claim 1 further characterized in that said body interior longitudinal cavity has a plurality of substantially cylindrical channels spaced therealong; and
    said spool being displaceable within said cavity along a longitudinal axis, said valve spool having a plurality of substantially cylindrical lands alternately spaced with a plurality of recessed regions, said recessed regions having at least one curved end portion.

4. A translation assembly as defined in claim 3 further characterized in that said recessed section plurality includes a central section and opposed side sections, said central section having opposed curved end portions and said side region having an increasing diameter conical portion extending away from said central recessed region.

5. The apparatus of claim 1 wherein said torsion bar means provides relative to said axis radial displacement between said ball screw means and said spool.

6. The apparatus of claim 1 wherein said torsion bar means provides relative to said axis angular displacement between said ball screw means and said spool.

7. The apparatus of claim 1 wherein said torsion bar means provides relative to said axis angular and radial displacement between said ball screw means and said spool.

8. A servo valve, comprising:
a spool, rotatable and translatable about a longitudinal axis;
a valve body having an interior cavity for receiving said spool;
rotary means positioned at a first end of said spool for providing rotation of said spool about said axis;
ball screw means attached to said spool at an opposed second end thereof for translating said rotation into displacement along said axis,
said ball screw means comprising an inner member affixed to said spool at said second spool end;
an outer hollow member affixed to said body configured to receive said inner member;
said inner member having an outer surface and said hollow member having an opposed inner surface both configured to form a helical channel along said axis extending thereabout approximately 360 degrees;
a plurality of displaceable balls located in said channel, said balls configured to substantially conform to said channel;
torsion bar means, disposed along said axis in an interior opening of said spool, having opposite ends affixed to said spool first end and said ball screw means, respectively, said torsion bar means for providing, relative to said axis, displacement between said ball screw means and said spool.

9. The servo valve of claim 8 wherein said helical channel and said balls have a clearance therebetween of approximately 0.0001 inch.

10. The apparatus of claim 8 wherein said spool inner opening has a diameter in excess of said torsion bar means diameter.

11. A translation assembly for use in a servo valve, comprising:
a spool rotatable and translatable about a longitudinal axis;
a body having an interior cavity for receiving said spool;
a ball/screw means attached to said spool at a first end thereof for translating rotation received at an opposed second spool end into axial spool displacement;
said spool having a substantially cylindrical interior opening and comprising,
a plurality of longitudinally spaced substantially cylindrical lands,
a plurality of recessed regions adjacent to said lands, said recessed regions having at least one substantially curved end portion abutting an adjacent land;
said recessed region plurality includes a central region and opposed side regions, said central region having said curved region at both ends thereof, said side region being defined by an increasing diameter conical portion meeting contiguously with an oppositely facing central curved region such that each conical portion widens from point proximate the meeting of said central and side regions and diametrically progresses in size along a length of said axis away from said central recessed region.

* * * * *